(12) United States Patent
Kakumu et al.

(10) Patent No.: US 8,244,099 B2
(45) Date of Patent: Aug. 14, 2012

(54) PICTURE REPRODUCING APPARATUS AND METHOD, RECORDING MEDIUM, AND PICTURE REPRODUCING PROGRAM

(75) Inventors: Tatsuya Kakumu, Tokyo (JP); Yasushi Fujinami, Tokyo (JP); Toshiya Hamada, Saitama (JP); Takenori Ohshima, Tokyo (JP); Koji Ihara, Chiba (JP); Akihiko Ueda, Kanagawa (JP); Shusuke Utsumi, Tokyo (JP)

(73) Assignees: Sony Computer Entertainment Inc., Tokyo (JP); Sony Corporation, Tokyo (JP)

( * ) Notice: Subject to any disclaimer, the term of this patent is extended or adjusted under 35 U.S.C. 154(b) by 1105 days.

(21) Appl. No.: 11/660,462

(22) PCT Filed: Jun. 29, 2005

(86) PCT No.: PCT/JP2005/011976
§ 371 (c)(1),
(2), (4) Date: Nov. 5, 2007

(87) PCT Pub. No.: WO2006/018932
PCT Pub. Date: Feb. 23, 2006

(65) Prior Publication Data
US 2008/0193109 A1 Aug. 14, 2008

(30) Foreign Application Priority Data

Aug. 19, 2004 (JP) ................................. 2004-239192
Dec. 2, 2004 (JP) ................................. 2004-350295

(51) Int. Cl.
*H04N 9/80* (2006.01)

(52) U.S. Cl. ......... 386/248; 386/246; 386/330; 386/332
(58) Field of Classification Search .................. 386/246, 386/248, 330, 332
See application file for complete search history.

(56) References Cited

U.S. PATENT DOCUMENTS

| | | | |
|---|---|---|---|
| 6,085,021 A * | 7/2000 | Tozaki et al. ................. 386/239 |
| 6,393,201 B1 | 5/2002 | Sakuramoto et al. | |
| 7,616,862 B2 * | 11/2009 | Yoo et al. ....................... 386/239 |
| 2003/0123846 A1 | 7/2003 | Hamada et al. | |

(Continued)

FOREIGN PATENT DOCUMENTS

EP          1 209 681          5/2002

(Continued)

OTHER PUBLICATIONS

Search Report issued in corresponding European application No. EP05755723 in related U.S. Appl. No. 11/660,486.

(Continued)

*Primary Examiner* — Nabil El Hady
(74) *Attorney, Agent, or Firm* — Frommer Lawrence & Haug LLP; William S. Frommer; Paul A. Levy

(57) ABSTRACT

To facilitate implementing a user operation control in a picture reproducing apparatus for reproducing contents recorded on a disk or the like. A picture reproducing apparatus selects and reproduces a plurality of prerecorded picture streams in the disk. A reproduction control unit is configured to reproduce the picture streams in either of two reproduction modes, i.e., a normal mode for accepting particular key inputs pertaining to picture reproduction and a menu mode for not accepting the particular key inputs. The mode in which the picture streams are reproduced may be written by contents creators in a script file which is recorded on the disk.

9 Claims, 12 Drawing Sheets

U.S. PATENT DOCUMENTS

| | | | |
|---|---|---|---|
| 2004/0047588 A1* | 3/2004 | Okada et al. | 386/46 |
| 2005/0105888 A1 | 5/2005 | Hamada et al. | |
| 2006/0110132 A1 | 5/2006 | Takakuwa et al. | |

FOREIGN PATENT DOCUMENTS

| | | |
|---|---|---|
| JP | 9 251761 | 9/1997 |
| JP | 10 97766 | 4/1998 |
| JP | 11 8834 | 1/1999 |
| JP | 2002 16850 | 1/2002 |
| JP | 2002 025235 | 1/2002 |
| JP | 2002 290899 | 10/2002 |
| JP | 2003 249057 | 9/2003 |
| JP | 2004 7518 | 1/2004 |
| JP | 2004 127397 | 4/2004 |
| WO | WO 02/091728 | 11/2002 |
| WO | WO 2004 025651 | 3/2004 |
| WO | WO 2004/032142 | 4/2004 |
| WO | WO 2004/049710 | 6/2004 |

OTHER PUBLICATIONS

Office Action issued in corresponding Chinese application No. 2005-80028168.2 in related application U.S. Appl. No. 11/660,486.

International Search Report of International Application No. PCT/JP2005/011977 issued in related U.S. Appl. No. 11/660,486.

Search Report issued in related European application No. 05755723.3 on Apr. 12, 2012.

* cited by examiner

PICTURE REPRODUCING APPARATUS AND METHOD, RECORDING MEDIUM, AND PICTURE REPRODUCING PROGRAM

TECHNICAL FIELD

The present invention relates to a picture reproducing technology for reproducing and displaying picture contents recorded on a recording medium such as a disk.

BACKGROUND ART

Picture reproducing apparatuses which reproduce moving image, game, and other contents recorded on a disk-shaped recording medium such as a DVD have become prevalent in recent years. With read-only DVD video specifications, button images and the like arranged on a menu screen are used to achieve user-interactive functions. For example, a menu screen can be called up by using a remote controller or the like during the reproduction of a DVD-video moving image, so that button images appearing on the menu screen can be selected so as to perform such processing as changing the scene to play.

In general, a DVD player switches a reproduction of main contents such as a moving image, a menu screen, and an image-quality and sound setup screen, based on user operations on the player itself or its remote controller.

DISCLOSURE OF THE INVENTION

Problems to be Solved by the Invention

In order for DVD players to disable such key inputs as play, stop, fast-forward, and rewind of a moving image while displaying a menu screen, it has been necessary to specify domains such as a menu domain and a title domain and set UOP (User Operation) controls for disabling the particular key inputs separately. This has required contents creators to set whether each individual key input is permitted or prohibited with respect to each domain, imposing a considerable burden on them. Furthermore, the function of starting reproduction at a pre-switch point when a user wants to resume the reproduction of the picture contents after switching to a menu screen has been made during the reproduction of picture contents (hereinafter, this function will be referred to as "resume play") is not defined in the DVD specifications but provided by each individual DVD player. The operation could thus vary from one model to another.

The present invention has been made in view of the foregoing problems, and a general purpose thereof is to provide a user control technology for reducing burdens on contents creators which a picture reproducing apparatus of a recording medium such as a DVD disk imposes.

Means to Solve the Problems

One embodiment of the present invention provides a picture reproducing apparatus which selects and reproduces a plurality of prerecorded picture streams. This apparatus has a first mode for accepting a particular key input pertaining to picture reproduction and a second mode for not accepting the particular key input, and reproduces the picture streams in either of the first mode and the second mode.

According to this embodiment, there are two defined reproduction modes, i.e. the first mode for accepting the particular key input pertaining to picture reproduction and the second mode for not accepting the particular key input, and the picture streams are reproduced in either one of the reproduction modes. This eliminates the need to set an UOP control for disabling the particular key input by a user, and allows more efficient contents creation than heretofore. Here, "the particular key input pertaining to picture reproduction" refers to such key inputs as play, stop, fast-forward, and rewind of the picture streams.

When shifting from the first mode to the second mode or shifting from the first mode to a stopped state in response to a user's key input, information pertaining to a picture stream under reproduction may be saved as a reproduction status. Consequently, when the reproduction of the main contents is restarted after an operation for switching to a menu screen or the like is performed during the reproduction of main contents such as a moving image, the reproduction status can be consulted to implement a resume play. For example, the reproduction status may include a playlist number, the file number of the picture stream, and a play time. It should be appreciated that the first mode corresponds to, for example, the "normal mode" in the embodiments and the second mode the "menu mode."

Another embodiment of the present invention also relates to a picture reproducing apparatus. This apparatus includes: an interface unit which accepts a particular key input pertaining to picture reproduction and issues a control command corresponding to the input; a reproduction control unit which reproduces a plurality of picture streams in accordance with the control command, the picture streams being prerecorded on a recording medium; and a script control unit which interprets and executes a script program pre-stored in the recording medium. Then, the reproduction control unit has a first mode for accepting the particular key input and a second mode for not accepting the particular key input, reproduces the picture streams in a mode specified by a command in the script program, and avoids executing the control command received from the interface unit in the second mode.

According to this embodiment, contents creators need not set an UOP control for disabling the particular key input by a user if the script program is written in the recording medium such as a DVD disk. This allows more efficient contents creation than heretofore.

Whether to save the reproduction status or not may be written in the script program. This makes it possible for contents creators to control whether or not to provide a resume play of the contents.

It should be appreciated that any conversions of expressions of the present invention from/into methods, systems, computer programs, recording media, and the like are also intended to constitute applicable embodiments of the present invention.

Advantages of the Invention

According to the present invention, contents creators can relatively easily implement user operation control when reproducing picture contents because the first mode for accepting particular key inputs and the second mode for not accepting the particular key inputs are defined in advance.

BEST MODE FOR CARRYING OUT THE INVENTION

First Embodiment

A first embodiment relates to a picture reproducing apparatus which reproduces and displays audio and video contents recorded on a recording medium such as a DVD disk. Apparatus of this type switches and displays a reproduction of main contents such as the main story of a motion picture, a menu screen for selecting scenes to play, and a screen for setting image quality, sound quality, etc.

Hereinafter, the configuration of the picture reproducing apparatus and the recording medium according to the first embodiment will be described. Then, typical operations of the picture reproducing apparatus will be described. Finally, a detailed description will be given of the switching of reproduction modes and a resume play according to the present invention.

Figure 1:
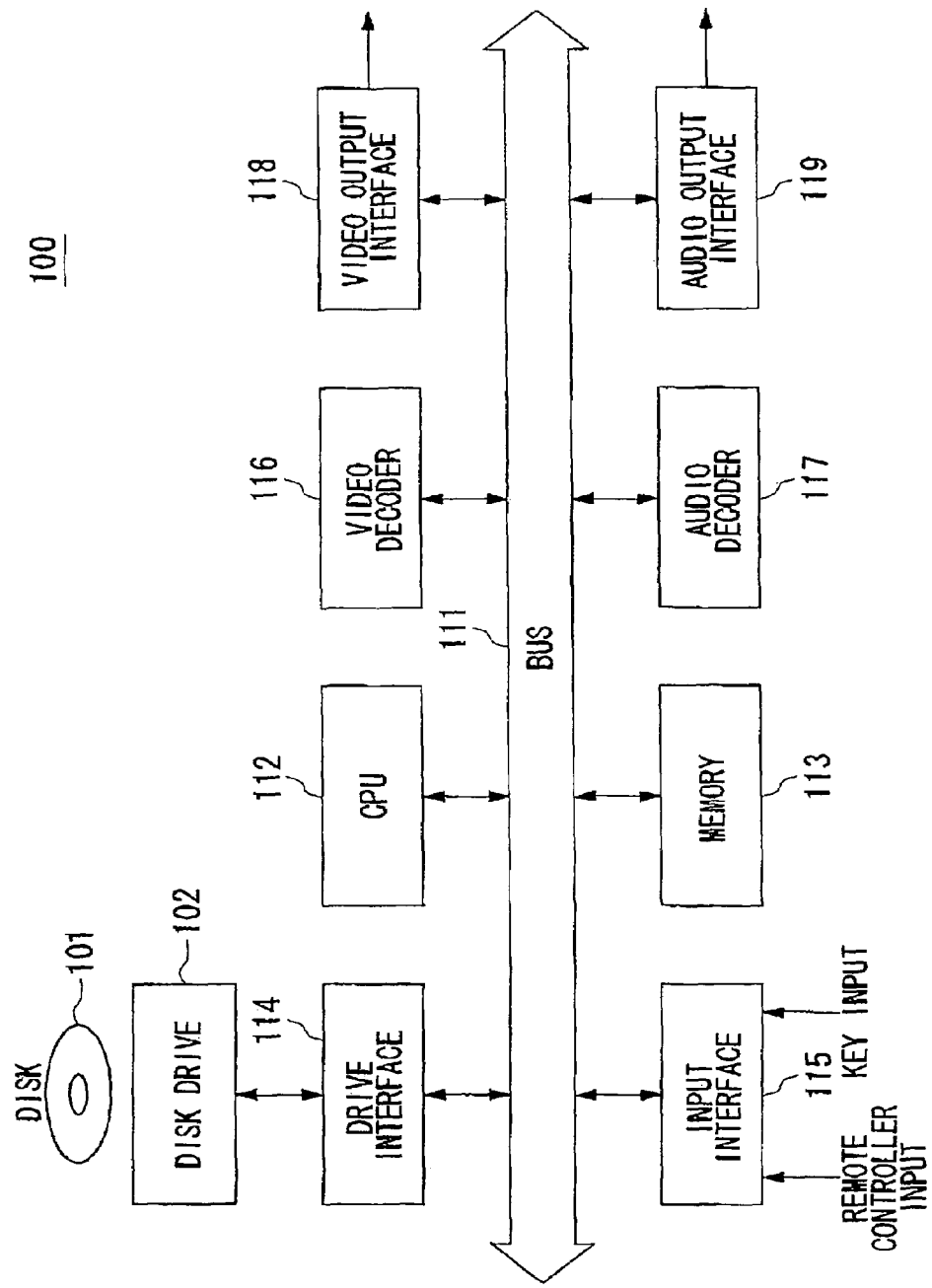
FIG. 1 is a hardware block diagram of a picture reproducing apparatus according to an embodiment of the present invention.

FIG. 1 is a hardware block diagram of a picture reproducing apparatus 100 according to the first embodiment. A disk 101 is a disk-shaped recording medium on which contents data and data necessary for reproduction are recorded. When the disk 101 is loaded into a disk drive 102, the data are read and the picture reproduction apparatus 100 starts reproducing picture contents. It should be appreciated that non-disk media such as a memory card or a memory cartridge may be used as the recording medium.

The disk drive 102 is connected to a drive interface 114. Read and other commands are transmitted from the drive interface 114 to the disk drive 102. The disk drive 102 operates in accordance with the commands, and sends read data and the like to the drive interface 114.

A CPU 112, a memory 113, the drive interface 114, an input interface 115, a video decoder 116, an audio decoder 117, a video output interface 118, and an audio output interface 119 are mutually connected through a bus 111.

The CPU 112 controls the operation of the entire picture reproducing apparatus 100. The memory 113 is used as a buffer for the contents data, and also used to store disk-specific information to be described later. The video decoder 116 and the audio decoder 117 decode video data and audio data read from the disk 101, respectively. The decoded video data is output from a not-shown video output terminal via the video output interface 118. Similarly, the decoded audio data is output from a not-shown audio output terminal via the audio output interface 119.

Key inputs provided on a operation panel (not-shown) of the picture reproducing apparatus 100 and input signals from a remote controller (not-shown) are input to the input interface 115, which sends this information to various types of devices.

Figure 2:
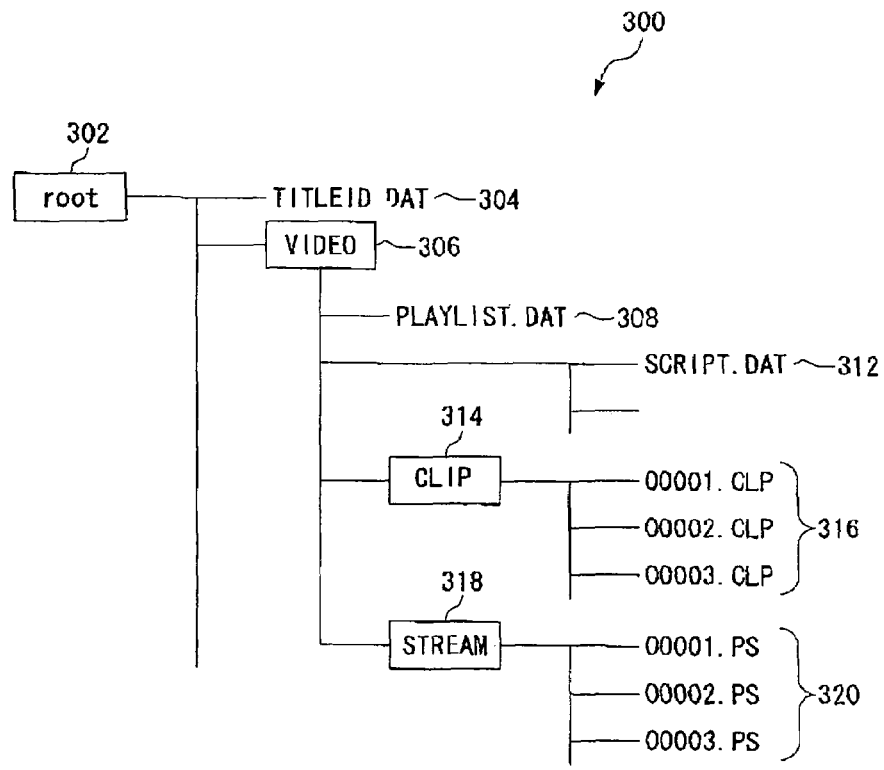
FIG. 2 is a diagram showing an example of the data structure of data files stored in a disk.

FIG. 2 shows the data structure of data files 300 stored in the disk 101. The data files 300 are hierarchically managed in a directory structure. Hereinafter, each of the data files will be overviewed.

A root directory 302 which represents the root of the file system contains a TITLEID.DAT file 304, which is title information on the contents, and a VIDEO directory 306. This VIDEO directory 306 contains two data files, i.e., a PLAYLIST.DAT file 308 and a SCRIPT.DAT file 312, and two directories, i.e., a CLIP directory 314 and a STREAM directory 318.

The TITLEID.DAT file 304 is a file having a title identifier (ID) which varies from one contents type to another. A single disk typically has one TITLEID.DAT file 304, whereas one disk may have two or more TITLEID.DAT files 304.

The PLAYLIST.DAT file 308 describes a playlist for specifying the order of reproduction of picture streams.

The SCRIPT.DAT file 312 is a script file which describes a script program. This SCRIPT.DAT file 312 is one to be read into a script control unit (which will be described later) prior to reproduction of the contents, in order to make the mode of reproduction of the disk 101 interactive. Detailed description thereof will be given later. The script file also contains information for specifying the screen layout of menu screens.

The CLIP directory 314 contains one or more data files, such as 00001.CLP, 00002.CLP, . . . (hereinafter, these will be referred to as "clip information files"). The STREAM directory 318 also contains one or more data files, such as 00001.PS, 00002.PS, . . . (hereinafter, these will be referred to as "clip stream files").

The clip stream files contain MPEG-2 program streams in which video, audio, and subtitle elementary streams are multiplexed. The clip stream files are created by performing compression and time division multiplexing on video and audio signals. The clip information files describe the properties and the like of the clip stream files that have filenames of the same numerals, respectively. The playlist mentioned above specifies the clip information files that have the same filenames as those of the clip stream files to be reproduced on this playlist. The picture reproducing apparatus 100 refers to the playlist to acquire information on the clip stream files, and then reads the corresponding clip stream files for decoding. It can thereby obtain a video signal, a subtitle signal, and an audio signal.

In this embodiment, the video elementary streams will be described as being MPEG2-Video. Nevertheless, the present embodiment is also applicable to MPEG4-Visual, MPEG4-AVC, and the like. Moreover, while the audio elementary streams will be described as being ATRAC audio, the present embodiment is also applicable to MPEG1/2/4 audio etc.

The present embodiment is characterized in that the script file recorded on the disk is interpreted by the script control unit in the picture reproducing apparatus 100, and the contents reproduction is performed in accordance with that program. In this example, the script file is written in an extended script language based on a known language specification "ECMAScript." The script file is composed of reproduction instructions for clip stream files and a series of commands for setting the picture reproducing apparatus. These commands make it possible to select any one of a plurality of prepared playlists or to perform reproduction of a playlist that contains conditional branches. Since such a script file is recorded on the disk, the picture reproducing apparatus implements interactive functions with users.

Figure 3:
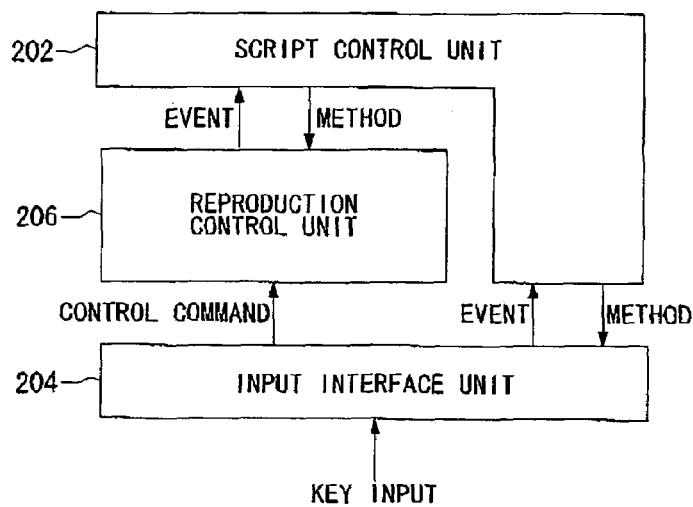
FIG. 3 is a diagram showing a model for explaining the operation of a script file.

Next, the exchange of commands between the script file and the reproduction control unit will be described with reference to FIG. 3. FIG. 3 is a diagram showing a model of the picture reproducing apparatus 100 for the purpose of explaining operations according to the script file. The picture reproducing apparatus 100 initially reads the script program, the playlist, and the clip information files from the disk 101, and reads and reproduces clip stream files in the order of reproduction defined thereby.

According to the language specifications of the script program, the functional block that reproduces the playlist is implemented as an "object." As employed herein, this object for reproducing the playlist and controlling video, audio, and subtitle reproduction will be referred to as a reproduction control unit 206. Commands for instructing reproduction of the playlist and setting of the picture reproduction apparatus make methods of this reproduction unit 206. The reproduction control unit 206 is controlled by the methods from the script control unit 202, which requires the function of notifying a shift in state and the start position of reproduction from the reproduction control unit 206 to the script control unit 202. This corresponds to issuing an event to the script control unit 202, and the processing corresponding to the event is written as an event handler.

In accordance with the commands from the input interface unit 204 caused by user's key inputs and the like, and the methods from the script control unit 202, the reproduction control unit 206 reads, decodes, and reproduces clip stream files based on the playlist and the clip information. The reproduction control unit 206 has three input and output paths, i.e., a path for accepting commands from the input interface unit 204, a path for notifying events to the script control unit 202, and a path for accepting methods from the script control unit 202.

The script control unit 202 executes a script and controls the reproduction control unit 206. The script control unit 202 receives events from the reproduction control unit 206 and issues methods. The script control unit 202 also receives events corresponding to user's key inputs from the input interface unit 204.

The input interface unit 204 accepts a key input made by the user, and determines whether this key input is a command to the reproduction control unit 206 or a command corresponding to a button that is drawn and displayed by the script. If the key input is a command to the reproduction control unit 206, the input interface unit 204 converts the user input into a control command to the reproduction control unit 206 and issues the command to the unit 206. If the key input is a command to a GUI component that is drawn and displayed by the script, the input interface unit 204 notifies the key input to the script control unit 202 as an event.

As has been described, for the purpose of role sharing, the reproduction control unit 206 controls video, audio, and subtitle decoding and display while the script control unit 202 arranges and displays GUI (Graphic User Interface) components such as buttons and executes processing when the GUI components are pressed.

Next, a description will be given of the event model of the reproduction control unit 206. The reproduction control unit 206 produces various events while reproducing the playlist. This event production causes the execution of processing programs called event handlers. These event handlers must be implemented in a script language by contents creators. Such a program execution model whereby events are produced on an irregular basis and processing programs start to execute upon the event production is called an "event-driven model."

In this embodiment, event handlers are prepared for respective events to be produced by the reproduction control unit 206. More specifically, a processing program to be performed when an event A occurs is determined to have a structure of onEventA( ), and its contents can be implemented by contents creators. For example, a Chapter mark is set at the top of the playlist, and a Chapter event occurs when reproduction starts from the top of the playlist. Moreover, a Chapter event is notified to the script control unit 202 upon each Chapter transition, and the corresponding event handler onChapter( ) is executed. When the reproduction reaches the end of the playlist, the reproduction is paused at the end and a PlayListEnd event is notified to the script control unit 202. In the onPlayListEnd( ) event handler, the script control unit 202 instructs to start reproducing another playlist. As above, since a model is constructed such that the information transmission from the reproduction control unit 206 to the script control unit 202 is effected by events and the control from the script control unit 202 to the reproduction control unit 206 is effected by methods, it is possible to control the reproduction of clip stream files by the script program.

The foregoing model makes video, audio, and subtitle reproduction possible, and events can be produced at certain times during reproduction preset by contents creators so that event handlers provided in advance are executed to achieve the operations intended by the contents creators. Moreover, since the input interface unit 204 notifies events to the script control unit 202 when it receives user's key inputs, it is also possible to execute operations prepared by the contents creators according to the user operations.

When there is no event handler written by the contents creators, a predetermined built-in operation (default event handler) will be performed or the event will be ignored without any execution. Events may be ignored intentionally by writing no event handler for the events where it is unnecessary to perform any processing at all.

Suppose a model in which a processing program will be called no matter what event occurs. In such a model, the preprocessing of checking which event has occurred and switching between the processing routines provided for respective events must be written in the processing program. Since a processing program like this must be implemented by contents creators, there might occur the problem of greater burdens on the contents creators despite the simple model. In addition, since the single large processing program is called up frequently, it might occupy a large volume of memory with the consequent problem of a drop in execution speed. In contrast, the model of preparing event-specific processing programs, i.e., event handlers, can reduce the foregoing problems.

As has been described, it is one of the characteristics of the first embodiment that user input events can shift the state of the reproduction control unit 206 and even trigger a new event so that the newly produced event is used for various processing.

Figure 4:
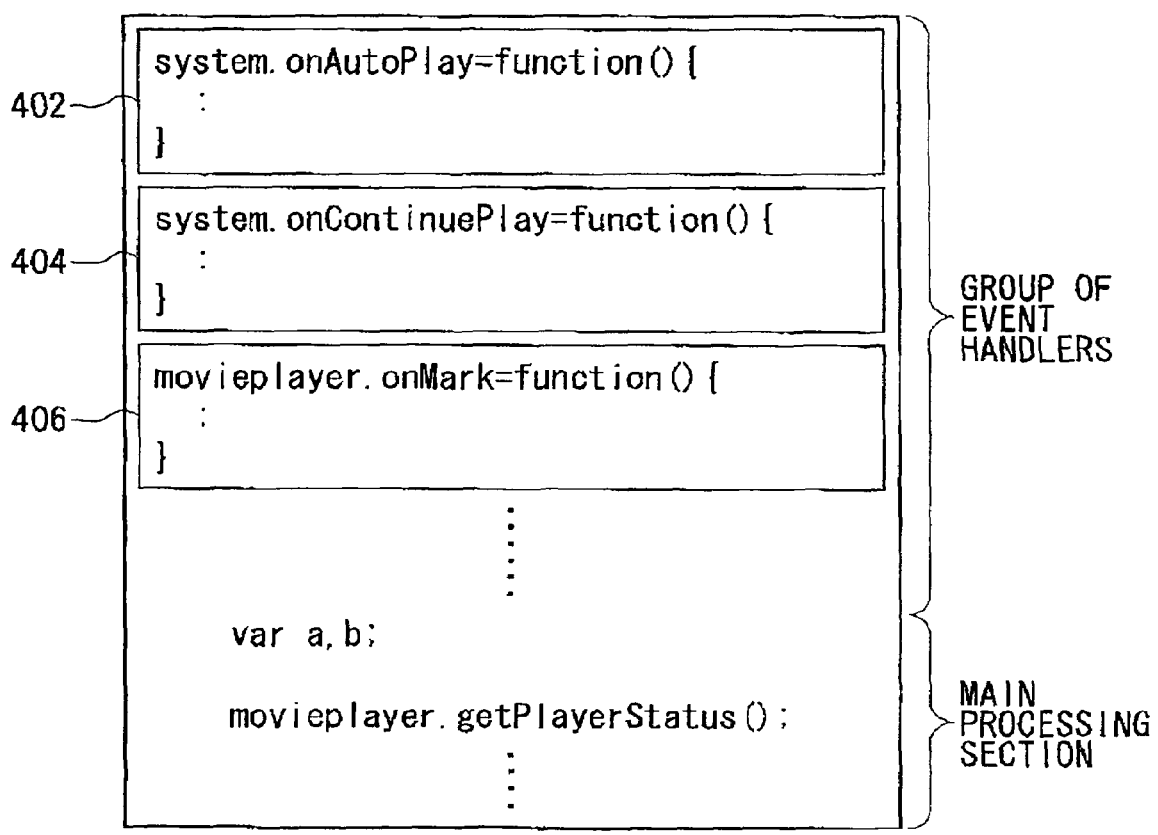
FIG. 4 is a diagram showing an example of the script file.

Next, an example of the configuration of the script file will be described with reference to FIG. 4. As shown in the diagram, the script file is composed of several groups of event handlers and a main processing section.

The onAutoPlay( ) event handler 402 is an auto-execute event handler, and is executed automatically when the disk is loaded in. The onContinuePlay( ) event handler 404 is an event handler for implementing a resume play. Furthermore, the onMark( ) event handler 406 is an event handler to be performed when a marked time is reached during reproduction.

Figure 5:
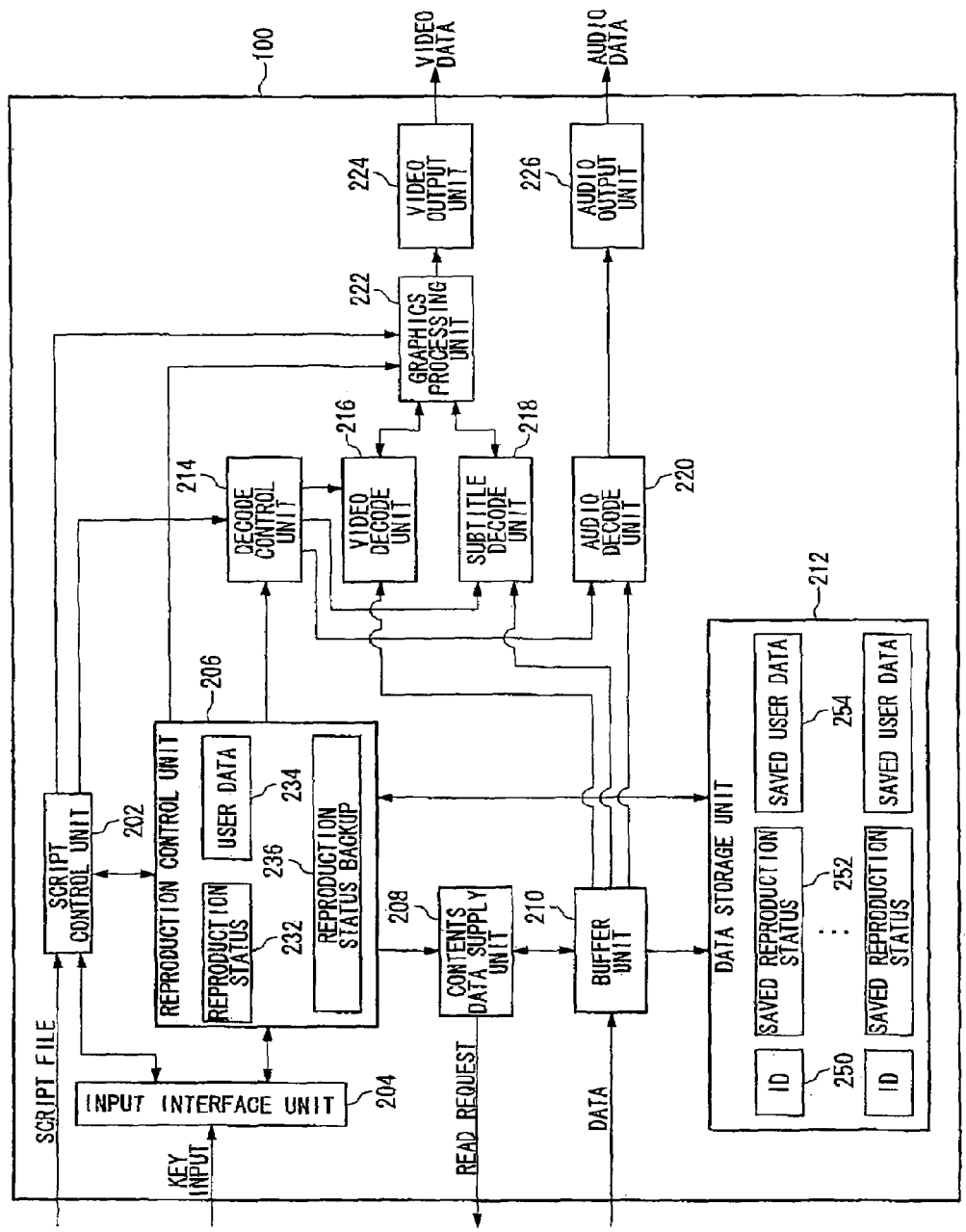
FIG. 5 is a functional block diagram of the picture reproducing apparatus according to the embodiment of the present invention.

FIG. 5 is a functional block diagram of the picture reproduction apparatus 100 which is achieved by cooperation of the foregoing hardware configuration and the script program.

When the picture reproduction apparatus 100 is powered on, a operating system (not-shown) initially starts up to perform necessary processing such as initialization, and calls a video contents reproducing program (not-shown). This video contents reproducing program performs basic functions such as checking whether or not the recorded data are video contents when the disk 101 is loaded in, reading the script file and supplying it to the script control unit 202, and supplying read data to the reproduction control unit 206. While the video contents reproducing program is in operation, the operating system operates the disk drive 102 via the drive interface 114 to provide such services as a file read from the disk 101.

The script control unit 202 interprets and executes the script program which is written in the script file. As mentioned above, the script file can describe the operations for operating the graphics processing unit 222 to create images such as a menu screen, and for controlling the reproduction control unit 206 in accordance with signals from user interfaces.

The reproduction control unit 206 refers to the data written in the disk 101 and exercises control as to the reproduction of the video contents. The reproduction control unit 206 also performs operations such as switching picture streams according to an instruction from the script control unit 202 or the input interface unit 204.

The reproduction control unit 206 has storage areas called reproduction status 232, user data 234, and reproduction status backup 236. The reproduction status 232 contains information pertaining to the playlist number, the play time, and the like of a playlist under reproduction. The user data 234 contains information which the contents creators intend to store depending on the contents. When a normal mode shifts to a menu mode (which will be described later), the information in the reproduction status 232 is backed up to the reproduction status backup 236 immediately before the menu mode is entered. The usages of the reproduction status 232, the user data 234, and the reproduction status backup 236 will be described later in conjunction with the flowcharts of FIGS. 7 to 12.

A contents data supply unit 208 reads clip stream files from the disk 101, and supplies and accumulates them to a buffer unit 210. Then, it supplies the clip stream files according to requests from a video decode unit 216, an audio decode unit 220, a subtitle decode unit 218, etc. It also reads files from the disk 101, taking account of the amount of data accumulated in the buffer unit 210. The buffer unit 210 uses part of the storage area of the memory 113 exclusively for its buffering area.

The data storage unit 212 makes the operations of writing and reading data specified by the reproduction control unit 206 to/from an area where it will not be erased even when the video contents reproducing program terminates. The data storage unit 212 has storage areas each called title ID 250, saved reproduction status 252, and saved user data 254. The information in the reproduction status backup 236 of the reproduction control unit 206 is recorded into the saved reproduction status 252. The information in the user data 234 of the reproduction control unit 206 is recorded into the saved user data 254. The data storage unit 212 has areas for a plurality of titles. More specifically, the data storage unit 212 can retain saved reproduction statuses and saved user data corresponding to the contents of a plurality of titles at once. These pieces of data are configured so that they can be searched for data corresponding to the contents of a disk by using the title IDs 250 as keys.

A decode control unit 214 controls the operations of the video decode unit 216, the subtitle decode unit 218, and the audio decode unit 220. The decode control unit 214 also has an internal clock, and manages synchronization between video and audio outputs.

The video decode unit 216 controls the video decoder 116 and decodes input video streams. It also outputs video data generated as the result of decoding to the graphics processing unit 222. Similarly, the audio decode unit 220 controls the audio decoder 117 and decodes input audio streams. It also outputs audio data generated as the result of decoding to an audio output unit 226.

The subtitle decode unit 218 decodes input subtitle streams, and outputs subtitle image data generated as the result of decoding to the graphics processing unit 222.

The graphics processing unit 222 receives both the video data from the video decode unit 216 and the subtitle image data from the subtitle decode unit 218. The graphics processing unit 222 zooms in/out the subtitle image data and adds it to the video data according to control commands, and performs zoom-in/out further to fit to the video output. The resulting image is output to a video output unit 224. In addition, the graphics processing unit 222 creates menus and messages according to instructions from the script control unit 202 and the reproduction control unit 206, and overlays them on the video signal for output.

Furthermore, the graphics processing unit 222 performs aspect conversion on the output signal in accordance with the aspect ratio of an output video device specified in advance and the output aspect ratio specified in the contents.

The video output unit 224 uses part of the memory 113 as a FIFO, thereby temporarily storing the input video data and outputting it from the video output interface 118. Similarly, the audio output unit 226 uses part of the memory 113 as a FIFO, thereby temporarily storing the input audio data and outputting it from the audio output interface 119.

Next, a description will be given of the mode switching of the reproduction control apparatus 206. In the present embodiment, two modes, i.e., a "normal mode" and a "menu mode," are prepared in advance in order for the reproduction control unit 206 to reproduce playlists in. A playlist is always reproduced in either one of the modes. Whether to reproduce a playlist in the normal mode or the menu mode, and what information is to be input and output at that time may be written in the script file in advance. It should be appreciated that the normal mode is the mode to be selected when reproducing main contents such as the main story of a movie. The menu mode is the mode to be selected when displaying menu contents for selecting desired clip stream files and making settings regarding switching of the display language such as between Japanese and English, the turning-on/off of subtitles, etc. In the present embodiment, a playlist can also be reproduced in the menu mode, thereby displaying menu contents using moving images.

In the normal mode, particular key inputs pertaining to the contents reproduction, such as key inputs for play, stop, fast-forward, and rewind are not restricted. In the menu mode, however, these particular key inputs are restricted. More specifically, when the reproduction control unit 206 is set in the menu mode, the reproduction control unit 206 will not execute commands even if it receives the control commands corresponding to these key inputs from the input interface unit 204. Consequently, the contents creators need not set an UOP control for disabling the particular key inputs by users as long as the mode for reproducing picture contents is specified in the script file. This makes it possible to create contents more efficiently than heretofore.

Figure 6:
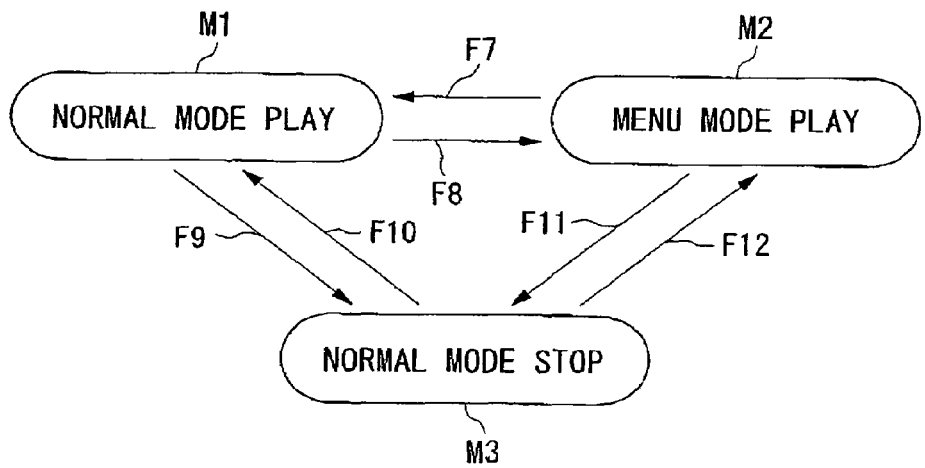
FIG. 6 is a state transition diagram showing three states including normal mode play, menu mode play, and normal mode stop, and transitions therebetween according to the embodiment of the present invention.

FIG. 6 is a state transition diagram showing three states, including reproduction in the normal mode (hereinafter, referred to as "normal mode play") (M1), reproduction in the menu mode (hereinafter, referred to as "menu mode play") (M2), and stop in the normal mode (hereinafter, referred to as "normal mode stop") (M3), and transitions between the states. The "normal mode stop" is the state where the contents are not reproduced and none of the particular key inputs pertaining to the reproduction of the contents is restricted. Hereinafter, a description will be given of operations when switching between the foregoing three states in the reproduction control unit 206. It should be appreciated that F7 to F12 in the diagram indicate which diagrams are to be referred to when describing the processing of respective transitions. "F7" indicates that a description will be given in conjunction with FIG. 7, and "F8" indicates that a description will be given with reference to FIG. 8. The same also holds for the rest.

Figure 7:
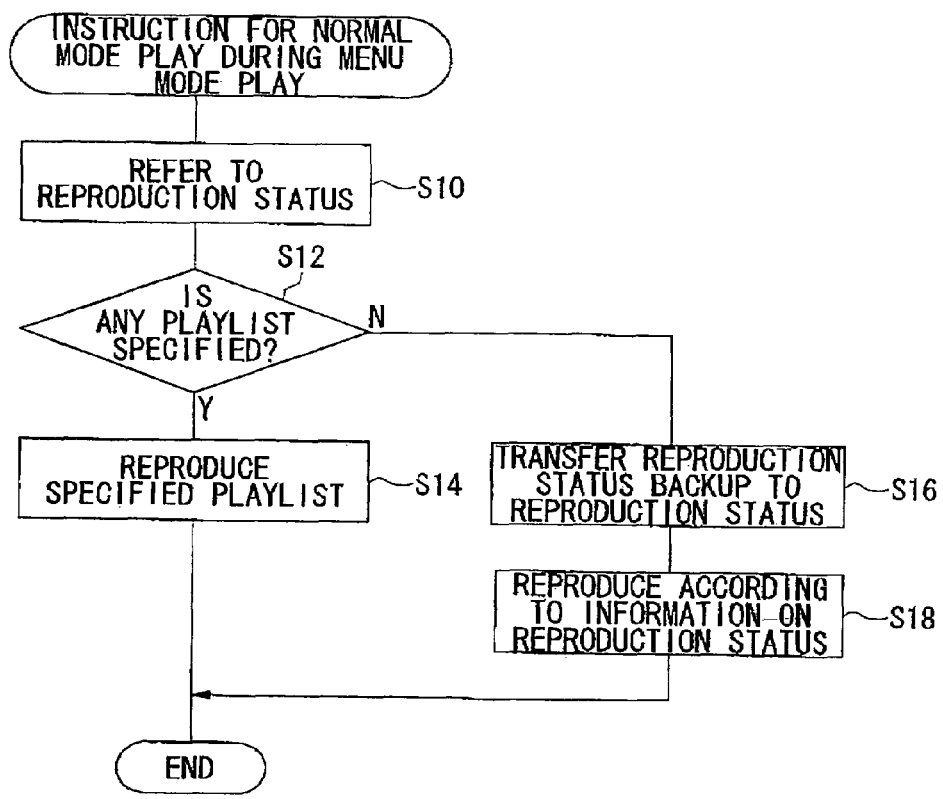
FIG. 7 is a flowchart for the case where an instruction for the normal mode play is given during the menu mode play.

FIG. 7 is a flowchart for the case where an instruction for the normal mode play is given during the menu mode play (F7 of FIG. 6). Here, the reproduction control unit 206 refers to the reproduction status 232 (S10). If any playlist is specified to be reproduced (Y at 312), the reproduction control unit 206 starts to reproduce the specified playlist (314) before ending. If no playlist is specified to be reproduced (N at S12), the information in the reproduction status backup 236 of the data storage unit 212 is transferred to the reproduction status 232 of the reproduction control unit 206 (S16) According to the information stored in this reproduction status 232 (such as the playlist number, video streams, subtitle streams, and play time), the reproduction of the contents is started in the normal mode (S18).

Figure 8:
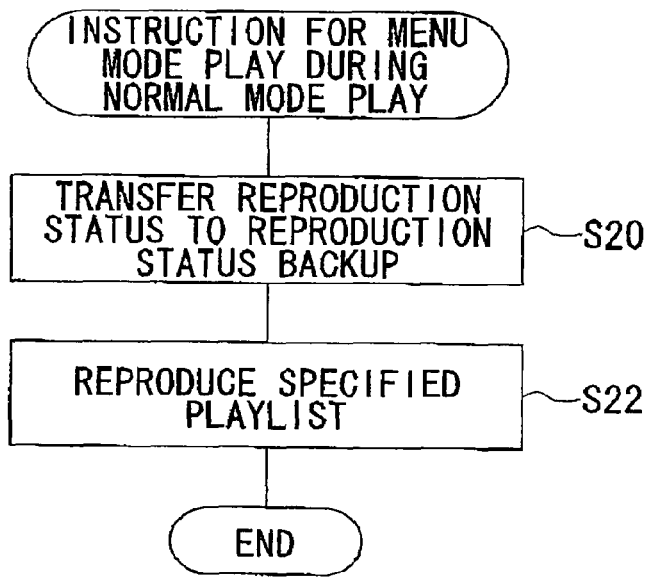
FIG. 8 is a flowchart for the case where an instruction for the menu mode play is given during the normal mode play.

FIG. 8 is a flowchart for the case where an instruction for the menu mode play is given during the normal mode play (F8 of FIG. 6) Here, the information stored in the reproduction status 232 of the reproduction control unit 206 is transferred to the reproduction status backup 236 (S20) before the reproduction of the playlist specified in the script file is started in the menu mode (S22).

Figure 9:
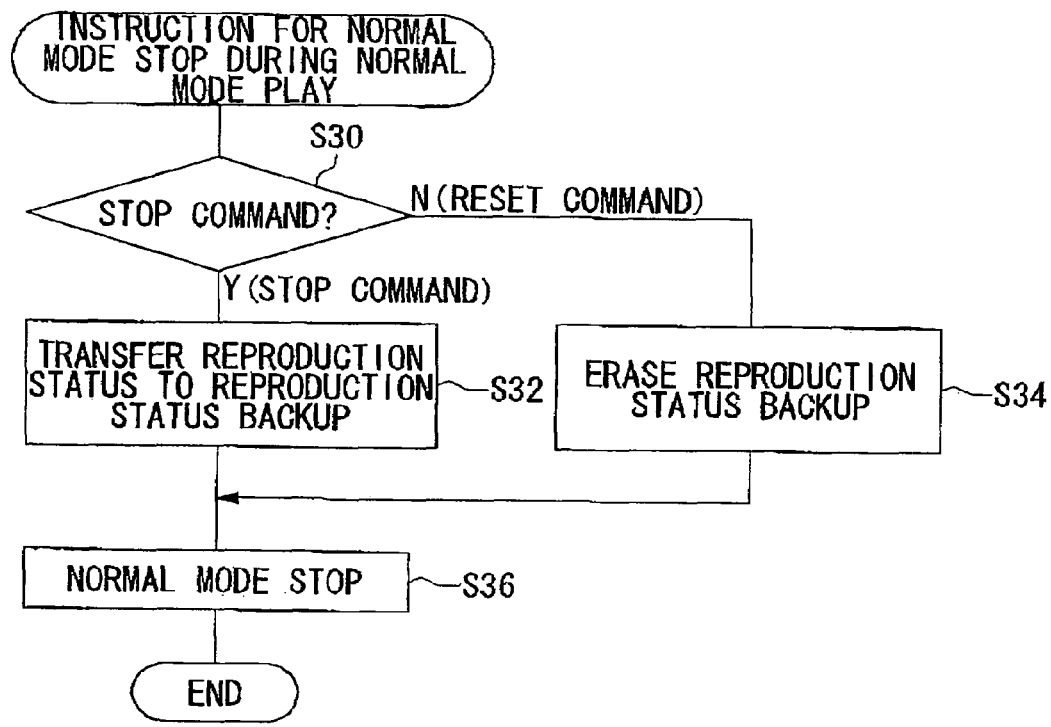
FIG. 9 is a flowchart for the case where an instruction for the normal mode stop is given during the normal mode play.

FIG. 9 is a flowchart for the case where an instruction for the normal mode stop is given during the normal mode play (F9 of FIG. 6). There are two types of commands for "stop": a reset( ) method, which is a command to stop without leaving information in the reproduction status backup 236 of the reproduction control unit 206; and a stop( ) method, which is a command to store information into the reproduction status backup 236 before stop. Initially, whether or not the stop instruction is the stop( ) method is determined (S30). If the stop instruction is the reset( ) method (N at S30), the reproduction control unit 206 erases the information in the reproduction status backup 236 (S34), and enters the menu mode stop state (S36). If it is the stop( ) method (Y at S30), the reproduction control unit 206 transfers the information in the reproduction status 232 to the reproduction status backup 236 (S32), and then enters the menu mode stop state (S36). In other words, the contents creators can erase information in the picture reproducing apparatus 100 by writing the reset( ) method into the script file.

For example, when reproducing contents having branches such as multi stories, the picture reproduction apparatus 100 cannot determine whether or not to retain information on the contents. In this case, when it is unnecessary to retain information such as at the end of the contents, the contents creators can write the reset( ) method in the script file so that the information is erased immediately.

Figure 10:
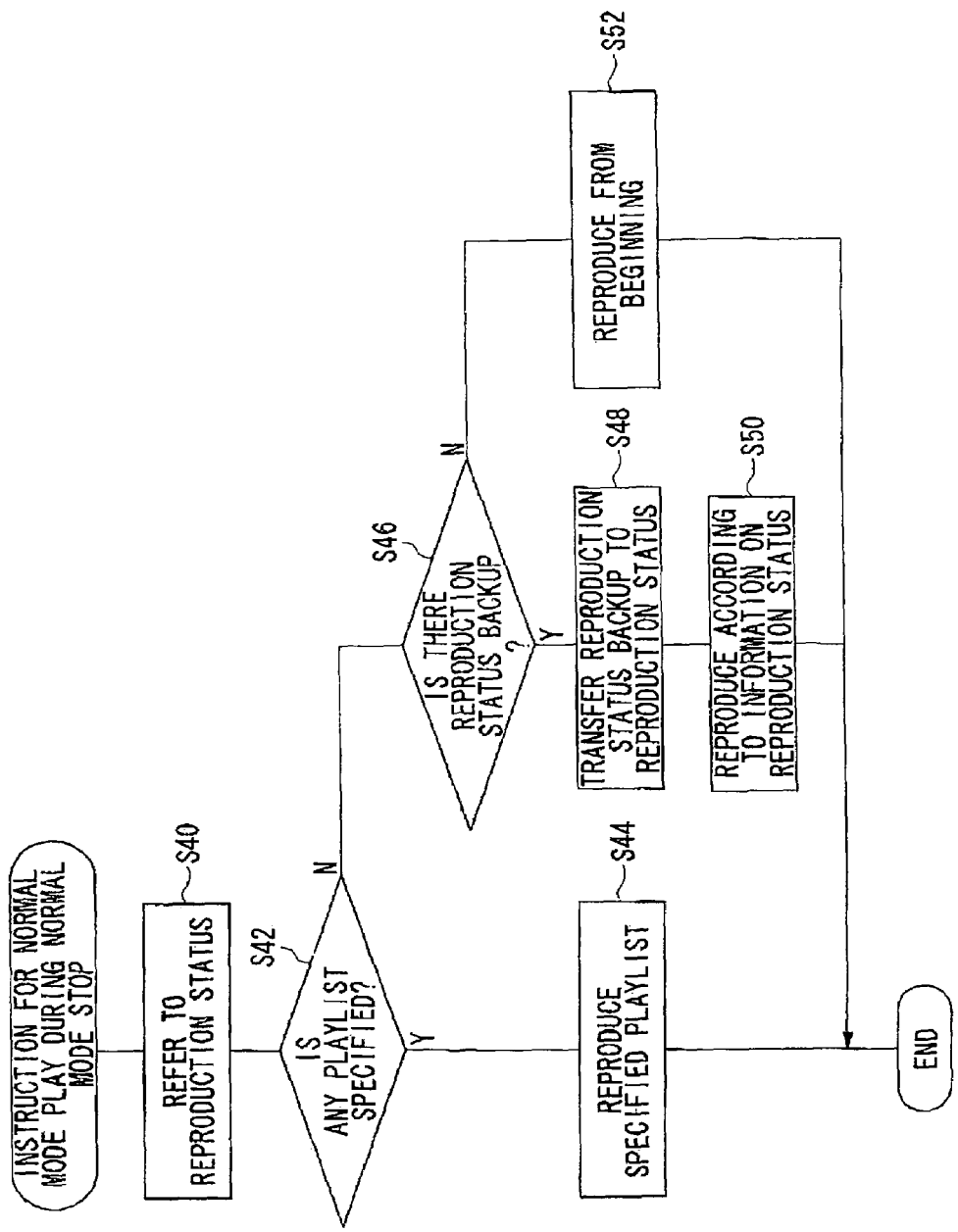
FIG. 10 is a flowchart for the case where an instruction for the normal mode play is given during the normal mode stop.

FIG. 10 is a flowchart for the case where an instruction for the normal mode play is given during the normal mode stop (F10 of FIG. 6). The reproduction control unit 206 refers to the reproduction status 232 (S40), and if any playlist is specified to be reproduced (Y at S42), starts to reproduce the specified playlist in the normal mode (S44). If no playlist is specified to be reproduced (N at S42), the reproduction status backup 236 of the reproduction control unit is checked by The reproduction control unit 206 for information (S46). If the reproduction status backup 236 contains any information (Y at S46), the information is transferred to the reproduction status 232 (S48) before The reproduction control unit 206 refers to the information stored in the reproduction status 232 and starts reproduction in the normal mode (S50). This makes it possible to implement a resume play in which the reproduction is started at a pre-switch point. If the reproduction status backup 236 does not contain any information (N at S46) the reproduction control unit 206 performs reproduction from the beginning of the contents (S52).

Figure 11:
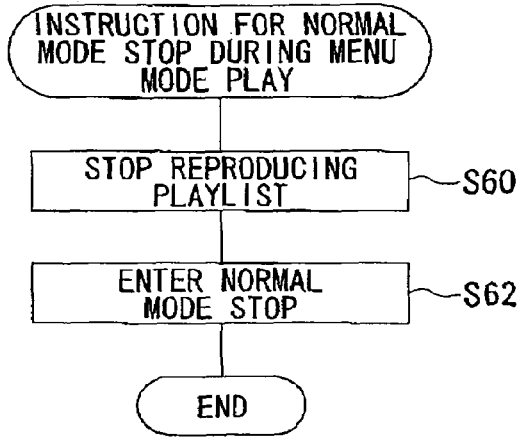
FIG. 11 is a flowchart for the case where an instruction for the normal mode stop is given during the menu mode play.

FIG. 11 is a flowchart for the case where an instruction for the normal mode stop is given during the menu mode play (F11 of FIG. 6). Here, the playlist simply stops being reproduced (S60), and the normal mode stop state is entered (s62) without changing the information in the reproduction status 232 and the reproduction status backup 236.

Figure 12:
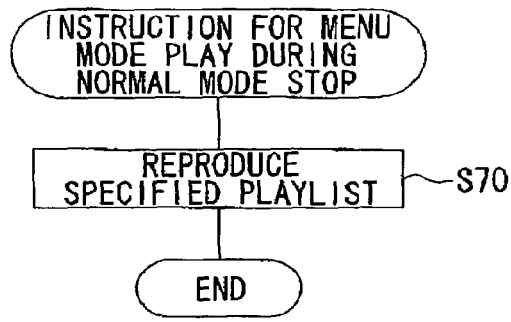
FIG. 12 is a flowchart for the case where an instruction for the menu mode play is given during the normal mode stop.

FIG. 12 is a flowchart for the case where an instruction for the menu mode play is given during the normal mode stop (F12 of FIG. 6). Again, the specified playlist is simply reproduced in the menu mode (S70) without changing the information in the reproduction status 232 and the reproduction status backup 236.

As has been described, according to the present invention, the normal mode in which particular key inputs are accepted and the menu mode in which particular key operations are not accepted are defined as reproduction modes, and picture streams are reproduced in either of these reproduction modes. Consequently, it becomes unnecessary to set a UOP control for disabling the particular key operations. This facilitates switching the user operation controls, and allows efficient contents creation. Basically, the contents creators can switch the user operation controls simply by selecting one of the modes.

Moreover, when the reproduction control unit 206 shifts between the states of the normal mode play, the menu mode play, and the normal mode stop, the information is exchanged as appropriate between the reproduction status 232 and the reproduction status backup 236 of the reproduction control unit 206, and the saved reproduction status 252 of the data storage unit 212. This makes it possible to implement a resume play by which reproduction is started from a pre-switch point when the user wants to return to the reproduction of the contents after the user switches the screen to a menu screen during the reproduction of contents.

Second Embodiment

The first embodiment has dealt with the picture reproducing apparatus that switches between three states including the normal mode play, the menu mode play, and the normal mode stop. A second embodiment will deal with a picture reproducing apparatus which switches between four states, including the foregoing plus a state of stop in the menu mode (hereinafter, referred to as "menu mode stop").

The "menu mode stop" state is the same as the menu mode play state in that particular key inputs pertaining to contents reproduction (such as play, stop, fast-forward, and rewind) are restricted.

As described above, in the menu mode play the contents specified in the script file by the contents creators are reproduced. This makes it possible for users to view dynamic menu screens. However, screens that contain picture contents need not be always used. A screen display with still images will be sufficient in the cases of switching display languages such as between Japanese and English, turning on/off subtitles, etc. In the first embodiment, however, the picture contents to be reproduced in the menu mode must be specified in the script file. The creation of menu screens that contain still images thus requires that the script file be programmed so as to pause the picture contents for display, which imposes burdens on the contents creators.

The second embodiment then provides the menu mode stop state as well as the menu mode play state. When in the menu mode stop state, the reproduction control unit 206 reads still images recorded in the script file (such as a PNG file and a JPEG file) instead of a playlist, and displays a menu screen using the still images. This reduces the burden on the contents creators when displaying still images in the menu mode. That is, contents data will not be reproduced at all in the menu mode stop state.

The operation when shifting from the menu mode stop to the normal mode play or the menu mode play utilizes the information in the reproduction states backup 236, in the same way as when shifting from the normal mode stop to the normal mode play or the menu mode play in the first embodiment.

Figure 13:
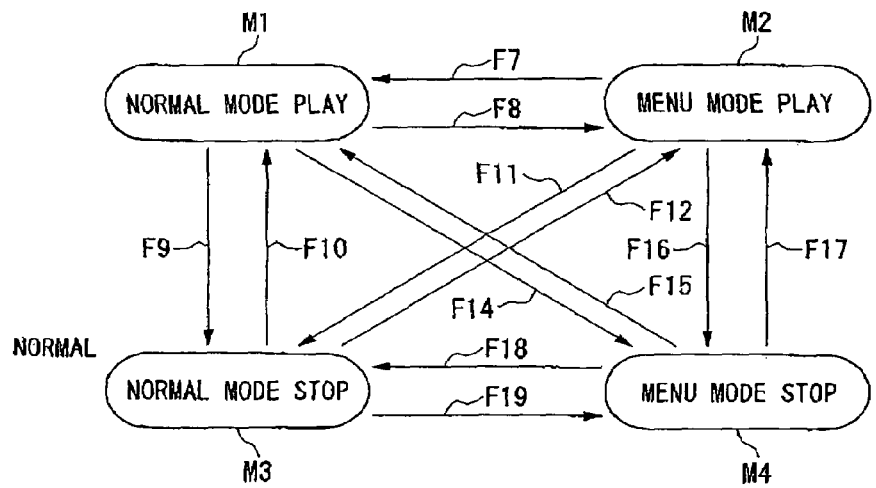
FIG. 13 is a state transition diagram showing four states including normal mode play, menu mode play, normal mode stop, and menu mode stop, and transitions therebetween according to another embodiment of the present invention.

FIG. 13 is a state transition diagram showing the four states of the reproduction control unit 206, including the normal mode play (M1), the menu mode play (M2), the normal mode stop (M3), and the menu mode stop (M4), and transitions between the states. As mentioned previously, F7 to F19 in the diagram indicate which diagrams to be referred to when describing the processing of respective transitions. Since F7 to F12 are the same as in the first embodiment, description thereof will be omitted. Hereinafter, the operations F14 to F19 of the reproduction control unit 206 will be described.

Figure 14:
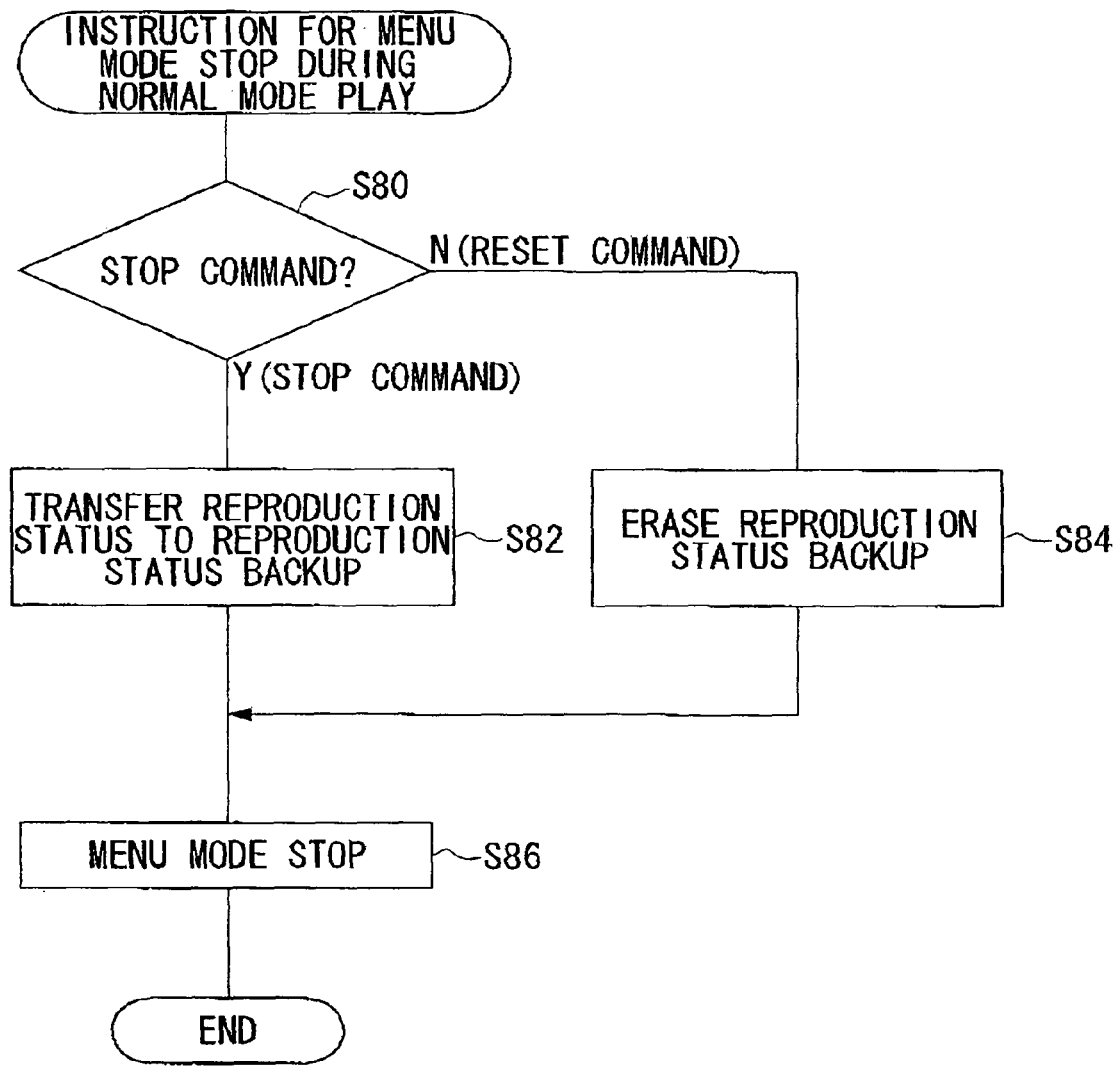
FIG. 14 is a flowchart for the case where an instruction for the menu mode stop is given during the normal mode play.

FIG. 14 is a flowchart for the case where an instruction for the menu mode stop is given during the normal mode play (F14 of FIG. 13). As described above, there are two types of commands for "stop": the reset( ) method, which is a command to stop without leaving information in the reproduction status backup 236 of the reproduction control unit 206; and the stop( ) method, which is a command to store information into the reproduction status backup 236 before stopping. Initially, whether or not the stop instruction is the stop( ) method is determined (S80). If the stop instruction is the reset( ) method (N at S80), the reproduction control unit 206 erases the information in the reproduction status backup 236 (S84), and enters the menu mode stop state (S86). If it is the stop( ) method (Y at S80), the reproduction control unit 206 transfers the information in the reproduction status 232 to the reproduction status backup 236 (S82), and then enters the menu mode stop state (S86).

Figure 15:
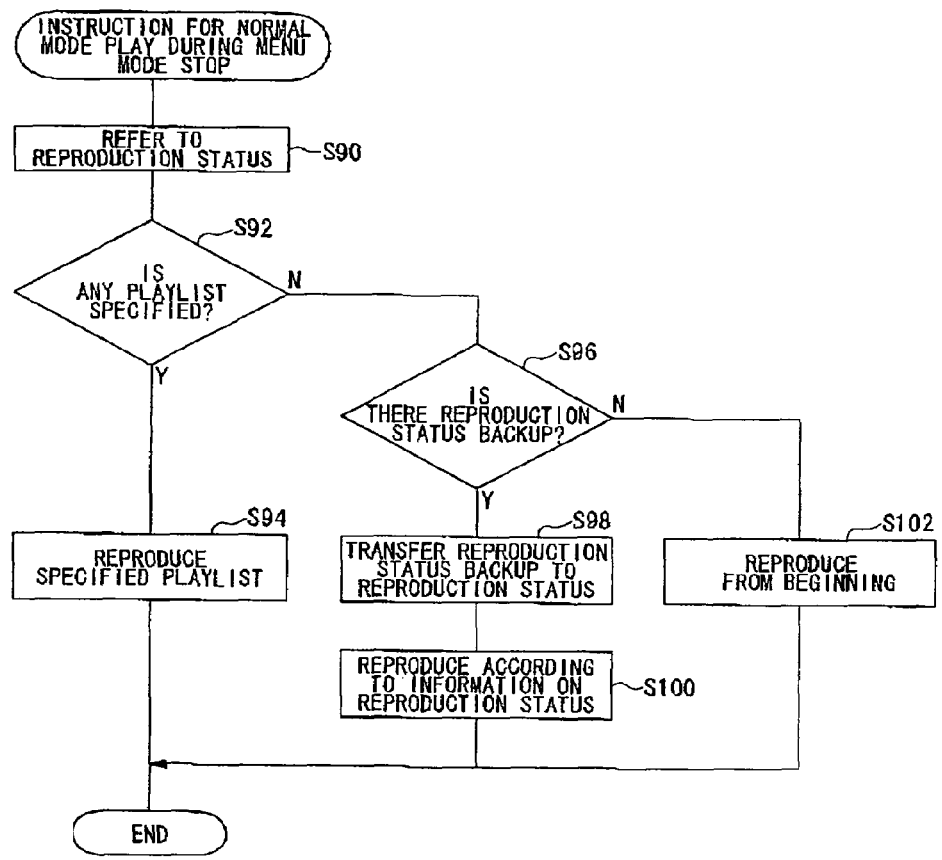
FIG. 15 is a flowchart for the case where an instruction for the normal mode play is given during the menu mode stop.

FIG. 15 is a flowchart for the case where an instruction for the normal mode play is given during the menu mode stop (F15 of FIG. 13). The reproduction control unit 206 refers to the reproduction status 232 (S90), and if any playlist is specified to be reproduced (Y at S92), the reproduction control unit 206 starts to reproduce the specified playlist in the normal mode (S94). If no playlist is specified to be reproduced (N at S92), The reproduction control unit 206 checks the reproduction status backup 236 of the reproduction control unit 206 for information (S96). If the reproduction status backup 236 contains any information (Y at S96), the information is transferred to the reproduction status 232 (S98) before the reproduction control unit 206 refers to the information stored in the reproduction status 232 and starts reproduction in the normal mode (S100). If the reproduction status backup 236 does not contain any information (N at S96), the reproduction control unit 206 starts reproduction from the beginning of the contents (S102).

Figure 16:
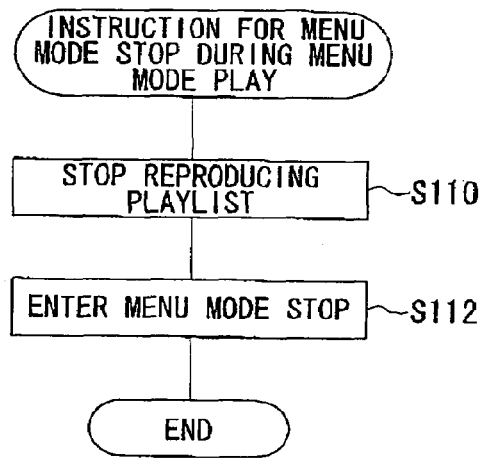
FIG. 16 is a flowchart for the case where an instruction for the menu mode stop is given during the menu mode-play.

FIG. 16 is a flowchart for the case where an instruction for the menu mode stop is given during the menu mode play (F16 of FIG. 13). Here, reproduction of the playlist simply stops (S110), and the menu mode stop state is entered (S112) without changing the information in the reproduction status 232 and the reproduction status backup 236.

Figure 17:
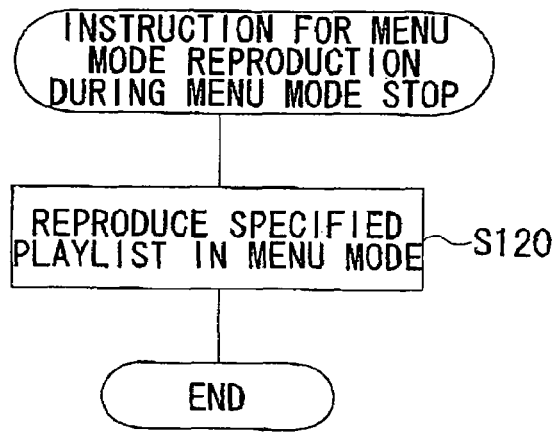
FIG. 17 is a flowchart for the case where an instruction for the menu mode play is given during the menu mode stop.

FIG. 17 is a flowchart for the case where an instruction for the menu mode play is given during the menu mode stop (F17 of FIG. 13). Again, the playlist specified in the script file is simply reproduced in the menu mode (S120) without changing the information in the reproduction status 232 and the reproduction status backup 236.

Figure 18:
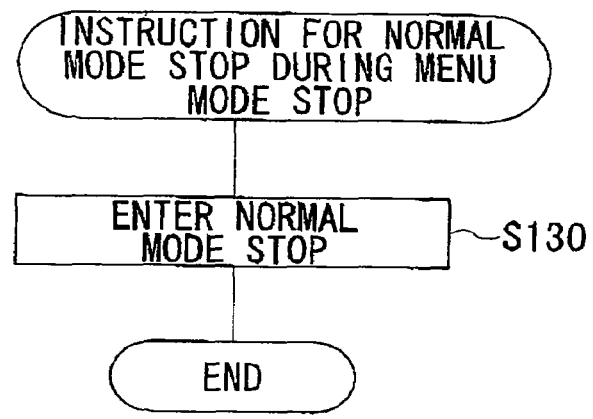
FIG. 18 is a flowchart for the case where an instruction for the normal mode stop is given during the menu mode stop.

FIG. 18 is a flowchart for the case where an instruction for the normal mode stop is given during the menu mode stop (F18 of FIG. 13). In this case, the normal mode stop state is entered (S130) without changing the information in the reproduction status 232 and the reproduction status backup 236.

Figure 19:
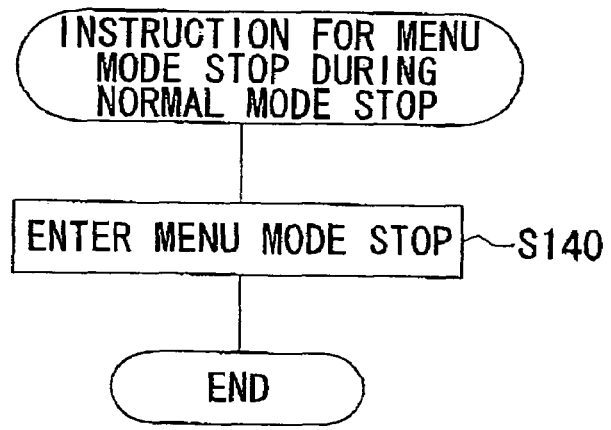
FIG. 19 is a flowchart for the case where an instruction for the menu mode stop is given during the normal mode stop.

FIG. 19 is a flowchart for the case where an instruction for the menu mode stop is given during the normal mode stop (F19 of FIG. 13). Again, the menu mode stop state is entered (S140) without changing the information in the reproduction status 232 and the reproduction status backup 236.

As has been described, according to the second embodiment, the contents creators can easily create menu screens that do not use the contents data but still images alone.

The present invention has been described with reference to the embodiments thereof. These embodiments have been given solely by way of illustration. It will be understood by those skilled in the art that various modifications may be made to combinations of the foregoing components and processes, and all such modifications are also intended to fall within the scope of the present invention. Hereinafter, such modifications will be described.

At the time of a resume play, the point of reproduction may be rewound by several seconds before reproduction, instead of restarting from the previous end point. This makes it easier for users to remember the picture contents that have been reproduced.

A first method of implementation is to record a time several seconds before the current time when recording the time into the reproduction status backup 236 as reproduction information. For example, in FIG. 8, a command to "record a time several seconds before the current time" may be issued when the script commands the menu mode play during the normal mode play. In another possible method, the time may be rewound to several seconds before the current time when the reproduction status 232 is transferred to the reproduction status backup 236 at S20. Alternatively, after the time information is recorded in the reproduction status backup 236, its contents may be rewritten to be several seconds earlier.

A second method of implementation is to command to reproduce picture contents from several seconds before the recorded time when reading information from the reproduction status backup 236. For example, in FIG. 7, a command to "rewind the time to several seconds before" may be issued when the script commands the normal mode play during the menu mode play. In another method available, the time may be rewound to several seconds before when the reproduction status backup 236 is transferred to the reproduction status 232 at S16.

Figure 20:
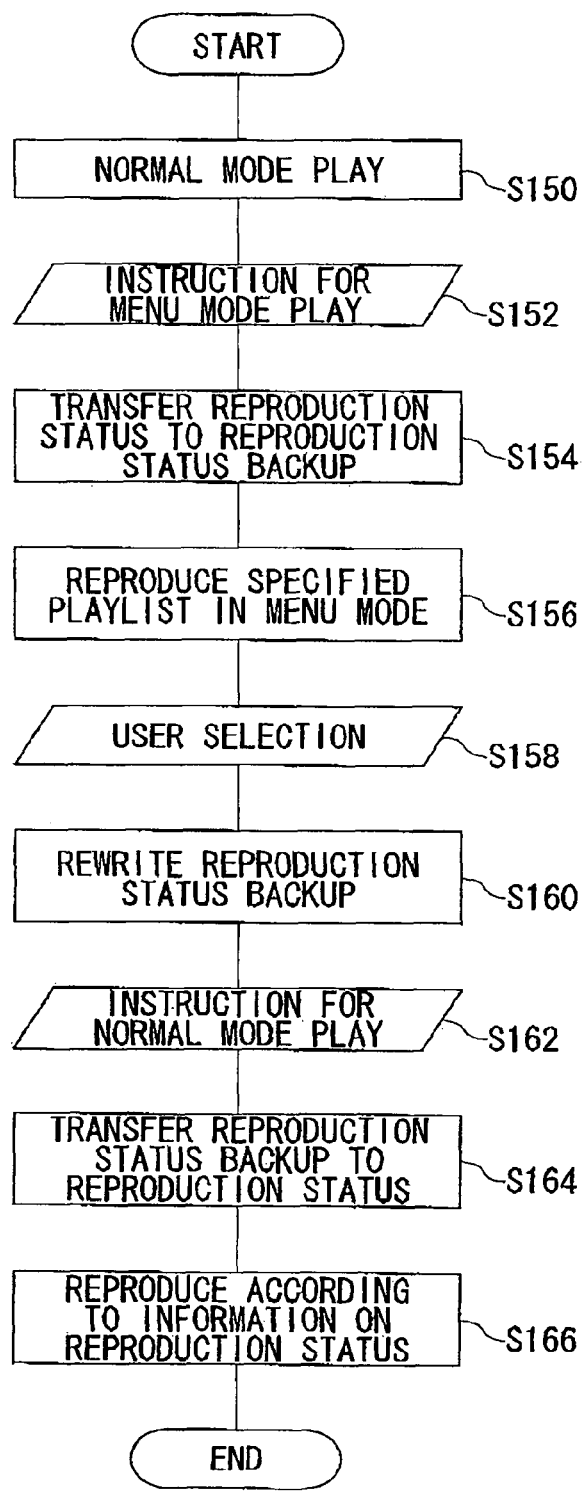
FIG. 20 is a flowchart showing an example of usage of a command for rewriting information recorded in reproduction status backup.

Moreover, the commands written in the script file may include a command for rewriting information recorded in the reproduction status backup 236. An example of usage of this command will be described with reference to FIG. 20.

During the normal mode play (S150), the user gives an instruction for the menu mode play (S152). The information stored in the reproduction status 232 of the reproduction control unit 206 is transferred to-the reproduction status backup 236 (S154), and the specified playlist is reproduced in the menu mode (S156). When the user instructs to change settings of any of the menu contents (such as subtitle on/off and audio languages) (S158), the information in the reproduction status backup 236 is rewritten (S160). When the user gives an instruction for the normal mode play (S162), the reproduction control unit 206 transfers the information in the reproduction status backup 236 of the data storage unit 212 to the reproduction status 232 of the reproduction control unit 206 (S164), and starts to reproduce the contents in the normal mode according to the information stored in this reproduction status 232 (S166).

As above, when shifting, for example, from the normal mode play to the menu mode play, the information in the reproduction status 232 at that time is recorded into the reproduction status backup 236 for the purpose of subsequent reproduction. If different information is selected by the user during the menu mode, however, the backup information is rewritten directly so that reproduction can be performed on the basis of that backup information when returning to the normal mode play. Aside from the foregoing, the rewritable information includes the subtitle, audio and video stream IDs, the playlist number, and the play time.

When reproducing special contents such as a game, resume play may be completely prohibited. For example, when the contents creator codes same processing on the oncontinuePlay( ) event handler as processing on the onAutoPlay( ) event hander, it is possible to prohibit resume play. Moreover, at the time of resume play, reproduction may be started from a playlist or a play time intended by the contents creators.

INDUSTRIAL APPLICABILITY

According to the present invention, it is possible to realize a user operation control when the picture reproducing apparatus reproduces picture contents.

What is claimed is:

1. A non-transitory computer-readable storage medium containing a plurality of picture streams so that the picture streams are reproduced on a reproducing apparatus and a script program which describes contents of control on reproduction of the picture streams by the reproducing apparatus,
wherein the script program:
associates each of the plurality of picture streams in advance with either a normal mode for accepting particular key inputs pertaining to picture reproduction, including play, stop, fast-forward and rewind of the picture streams, or a menu mode for not accepting the particular key inputs without describing the control for each event corresponding to the particular key inputs, the normal mode being a mode to be selected when reproducing main contents and the menu mode being a mode to be selected when reproducing menu contents on the display; and
includes a command for making the reproducing apparatus read information on the mode associated with the picture streams and reproduce the picture streams in the normal mode or the menu mode in accordance with the information when the recording medium is operated in the reproducing apparatus, and a command for displaying the menu contents using at least one of the picture streams;
wherein the script program associates the at least one of the picture streams used in the menu contents with the menu mode so that the reproducing apparatus is operable to ignore the particular key inputs by the user then reproducing menu contents on the display.

2. The non-transitory computer-readable storage medium according to claim 1, wherein the script program further includes a command for instructing the reproducing apparatus to save information pertaining to a picture stream under reproduction as a reproduction status into the recording medium or the reproducing apparatus when shifting from the normal mode to the menu mode or shifting from the normal mode to a stopped state in response to a user's key input while the recording medium is operated in the reproducing apparatus.

3. The non-transitory computer-readable storage medium according to claim 2, wherein the script program further includes a command for instructing the reproducing apparatus to read the reproduction status saved in the recording medium or the reproducing apparatus and reproduce the picture stream in accordance with the information when shifting from the menu mode to the normal mode or shifting from the stopped state to the normal mode in response to a user's key input while the recording medium is operated in the reproducing apparatus.

4. The non-transitory computer-readable storage medium according to claim 2, wherein the script program further includes a command for instructing the reproducing apparatus not to save the reproduction status when shifting between modes.

5. The non-transitory computer-readable storage medium according to claim 2, wherein the script program instructs to save a time of the picture stream under reproduction as the reproduction status.

6. The non-transitory computer-readable storage medium according to claim 5, wherein the script program further includes a command for instructing to save a time different from the time of shifting between modes as the reproduction status.

7. The non-transitory computer-readable storage medium according to claim 5, wherein the script program further includes a command for instructing the reproducing apparatus to reproduce the picture stream from before the time saved as the reproduction status when shifting from the menu mode to the normal mode or shifting from the stopped state to the normal mode in response to a user's key input.

8. A method for controlling reproduction of a plurality of picture streams recorded on a recording medium, comprising:
recording a script program in advance on the same medium as the picture streams are recorded, the script program describing contents of control on the reproduction of the picture streams by a reproducing apparatus;
associating each of the plurality of picture streams in the recording medium in advance with either a normal mode for accepting particular key inputs pertaining to picture reproduction, including play, stop, fast-forward and rewind of the picture streams, or a menu mode for not accepting the particular key inputs without describing the control for each event corresponding to the particular key inputs, the normal mode being a mode to be selected when reproducing main contents on a display and the menu mode being a mode to be selected when reproducing menu contents on the display; and
making the reproducing apparatus read information on the mode associated with the picture streams and reproduce the picture streams in the normal mode or the menu mode in accordance with the information when the recording medium is operated in the reproducing apparatus,
wherein the script program associates the picture streams used in the menu contents with the menu mode so that the reproducing apparatus is operable to ignore the particular key inputs by the user when reproducing menu contents on the display.

9. A program embodied on a non-transitory computer-readable storage medium for making a reproducing apparatus execute contents of control on reproduction of a plurality of picture streams stored in the computer-readable storage medium, wherein:
the plurality of picture streams are associated in advance with either a normal mode for accepting particular key inputs pertaining to picture reproduction, including play, stop, fast-forward and rewind of the picture streams, or a menu mode for not accepting the particular key inputs without describing the control for each event corresponding to the particular key inputs, the normal mode being a mode to be selected when reproducing main contents on a display and the menu mode being a mode to be selected when reproducing menu contents on the display; and
the program makes the reproducing apparatus read information on the mode associated with the picture streams and reproduce the picture streams in the normal mode or the menu mode in accordance with the information when the recording medium is operated in the reproducing apparatus,
wherein the script program associates the picture streams used in the menu contents with the menu mode so that the reproducing apparatus is operable to ignore the particular key inputs by the user when reproducing menu contents on the display.

* * * * *